United States Patent
Josten et al.

(10) Patent No.: US 6,781,818 B2
(45) Date of Patent: Aug. 24, 2004

(54) BUS BRACE COMB ASSEMBLY (75) Inventors: Harry W. Josten, Grapevine, TX (US); Jason P. Wiant, Bedford, TX (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 10/602,757

(22) Filed: Jun. 24, 2003

(65) Prior Publication Data

US 2004/0100785 A1 May 27, 2004

Related U.S. Application Data (60) Provisional application No. 60/428,564, filed on Nov. 22, 2002.

(51) Int. Cl.$^7$ .................................................. H02B 1/20
(52) U.S. Cl. ........................ 361/611; 361/648; 361/649; 174/68.2; 174/149 B
(58) Field of Search ................................ 361/611, 624, 361/637–638, 648–649; 174/68.2, 149 B (56) References Cited

U.S. PATENT DOCUMENTS

| | | | | |
|---|---|---|---|---|
| 3,315,132 A | * | 4/1967 | Raymond | 361/829 |
| 3,961,129 A | | 6/1976 | Gehrs et al. | 174/72 B |
| 4,029,377 A | | 6/1977 | Guglielmi | 339/19 |
| 4,030,794 A | | 6/1977 | Rozenboom et al. | 339/22 B |
| 4,239,316 A | | 12/1980 | Spaulding | 339/91 R |
| 4,307,304 A | * | 12/1981 | Kovatch et al. | 307/147 |
| 4,366,528 A | | 12/1982 | Cole | 361/429 |
| 4,419,715 A | | 12/1983 | Pear | 361/335 |
| 4,449,771 A | | 5/1984 | Carr | 339/19 |
| 4,493,009 A | | 1/1985 | Lorenz et al. | 361/341 |
| 4,658,504 A | | 4/1987 | Sinharoy et al. | 29/873 |
| 4,688,013 A | | 8/1987 | Nishikawa | 337/168 |
| 4,768,967 A | | 9/1988 | Fritsch | 439/152 |
| 4,905,123 A | | 2/1990 | Windle et al. | 361/388 |
| 5,021,014 A | | 6/1991 | Walter et al. | 439/798 |
| 5,157,584 A | | 10/1992 | Rowe | 361/355 |
| 5,166,861 A | | 11/1992 | Krom | 361/379 |
| 5,343,356 A | | 8/1994 | Hancock | 361/637 |
| 5,375,036 A | | 12/1994 | Magdaleno | 361/673 |
| 5,535,102 A | | 7/1996 | Neill et al. | 361/832 |
| 5,745,338 A | | 4/1998 | Bartolo et al. | 361/637 |
| 5,950,974 A | | 9/1999 | Hoffmann | 248/223.41 |
| 6,069,321 A | | 5/2000 | Wagener et al. | 174/99 B |
| 6,072,377 A | | 6/2000 | Tajima et al. | 333/154 |
| 6,105,741 A | | 8/2000 | Ross | 191/23 A |
| 6,111,745 A | * | 8/2000 | Wilkie et al. | 361/605 |
| 6,141,206 A | | 10/2000 | Bruner et al. | 361/605 |
| 6,169,248 B1 | | 1/2001 | Rowe et al. | 174/50 |
| 6,201,722 B1 | * | 3/2001 | Hutchins | 363/144 |
| 6,327,157 B1 | | 12/2001 | Mann et al. | 361/775 |
| 6,381,122 B2 | | 4/2002 | Wagener | 361/611 |
| 6,489,567 B2 | * | 12/2002 | Zachrai | 174/149 B |

* cited by examiner

Primary Examiner—Boris Chërvinsky
(74) Attorney, Agent, or Firm—Foley & Lardner LLP (57) ABSTRACT A bus brace comb assembly for use in a switchgear assembly. The switchgear assembly has a channel bus bar for conveying electrical current in each phase of the switchgear assembly. The bus brace comb assembly holds the bus bar in place against magnetic forces associated with short-circuit currents in the switchgear bus bar. The bus brace comb assembly comprises a front comb assembly including a first bus clip configured to position the bus bar and a front brace coupled to the bus clip. A rear comb assembly including an interlock clamp configured to engage the channel bus bar and a second bus clip secured to the interlock clamp with a fastener and a rear brace coupled to the interlock clamp/bus clip assembly. A flange of the channel bus bar is pinched in the interlock clamp/bus clip assembly to secure channel bus bar in the switchgear assembly.

18 Claims, 7 Drawing Sheets

BUS BRACE COMB ASSEMBLY

CROSS-REFERENCE TO RELATED PATENT APPLICATIONS

This application claims benefit of U.S. Provisional Application No. 60/428,564, filed Nov. 22, 2002.

BACKGROUND OF THE INVENTION

The present invention relates generally to the field of electrical switchboards and panelboards having vertical bus bars, and more particularly to a bus brace comb assembly used to hold the bus bars in place against magnetic forces associated with short circuit currents in the switchboards and panelboards.

Switchgear assemblies, switchboards and panelboards are general terms which cover metal enclosures, housing switching and interrupting devices such as fuses, and circuit breakers, along with associated control, instrumentation and metering devices. Such assemblies typically include associated bus bars, interconnections and supporting structures used for the distribution of electrical power. Low voltage switchgear and switchboards operate at voltages up to 600 volts and with continuous currents up to 5000 amps or higher. Such devices are also designed to withstand short circuit currents ranging up to 200,000 amps (3 phase rms symmetrical).

Typical switchgear equipment is composed of a lineup of several metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses. The vertical bus bars in each section are supplied with current by a horizontal main bus bar that runs through the lineup of metal enclosed sections. A typical arrangement includes bus bars for each electrical phase of a multiple phase system which may include three power phases and a neutral.

The vertical or section buses described above must be braced to withstand the magnetic forces created by the short circuit currents that pass through the switchgear during a short circuit fault. High short-circuit current levels in the bus bars create conditions that require extensive bracing. This makes high short-circuit rated designs more expensive to build in terms of material and labor and additional bracing often limits the combination of breakers that can be put in a switchgear or panelboard assembly.

Thus, there is a need for a bus bar brace assembly that provides sufficient strength to withstand magnetic forces associated with short-circuit currents in the switchgear assembly. There is further need for a switchgear assembly that includes channel bus bars for each electric power phase and for supporting such channel bus bars in the manner to withstand magnetic forces associated with a short circuit current in the switchgear assembly. There is a further need for a bus brace comb assembly that provides for a compact arrangement of channel bus bars within a switchgear assembly and allows for additional insulating barriers between the channel buses of each electrical power phase of the switchgear assembly.

SUMMARY OF THE INVENTION

One embodiment of the invention relates to a bus brace comb assembly for use in a switchgear assembly. The switchgear assembly has a channel bus bar for conveying electrical current in each phase of the switchgear assembly. The bus brace comb assembly holds the bus bar in place against magnetic forces associated with short-circuit currents in the switchgear bus bar. The bus brace comb assembly comprises a front comb assembly including a first bus clip configured to position the bus bar and a front brace coupled to the bus clip. A rear comb assembly including an interlock clamp configured to engage the channel bus bar and a second bus clip secured to the interlock clamp with a fastener and a rear brace coupled to the interlock clamp/bus clip assembly. A flange of the channel bus bar is pinched between the rear brace and the interlock clamp/bus clip assembly to secure the channel bus bar in the switchgear assembly. Another embodiment includes a third bus clip a spaced distance from the first bus clip and coupled to the front brace. Another embodiment of the bus brace comb assembly provides E-shaped bus clips. An insulation cover can be provided over one of the front comb assembly and rear comb assemblies.

Another embodiment provides a switchgear assembly which includes a channel bus bar for each electric power phase and for conveying electric current. The channel bus bars are maintained in position by a bus brace comb assembly embraced against magnetic forces associated with short-circuit currents in the switchgear bus bars by the bus brace comb. The bus brace comb assembly comprises a front comb assembly including a first bus clip configured to position the bus bar and a front brace coupled to the bus clip. A rear comb assembly including an interlock clamp is configured to engage the channel bus bar and a second bus clip secured to the interlock clamp with a fastener. A rear brace is coupled to the interlock clamp/bus clip assembly, wherein a flange of the channel bus bar is pinched between the rear brace and the interlock clamp/bus clip assembly to secure the channel bus bar. Another embodiment of the switchgear assembly includes a third bus clip a spaced distance from the first bus clip and coupled to the front brace. Another embodiment of the switchgear assembly provides E-shaped bus clips. An insulation cover can be coupled to one of the front comb assembly and rear comb assembly of the switchgear assembly.

There is also provided a method of securing and positioning channel bus bars in each power phase of the switchgear assembly with a bus brace comb assembly. The bus brace comb assembly has a front comb assembly and a rear comb assembly. The method comprises the steps of positioning each channel bus bar and a bus clip of the front comb assembly. Installing an interlock clamp to couple with at least one flange of a channel bus bar in each power phase. Fastening another bus clip to the interlock clamp. Coupling a rear brace to each bus clip/interlock clamp assembly, wherein the flange of the channel bus bar is pinched in the interlock clamp/bus clip assembly to secure the channel bus bar. Another embodiment includes the step of coupling a front brace to the bus clip of the front comb assembly. Another embodiment of the method includes the step of installing an insulation cover on the bus brace comb assembly.

DETAILED DESCRIPTION OF THE EXEMPLARY EMBODIMENTS

Before describing exemplary embodiments of a bus brace comb assembly and a switchgear assembly, several comments are appropriate. Switchgear assemblies and panelboard assemblies typically include vertical (section) bus bars to distribute electrical power within the assemblies. In a short circuit condition, extreme magnetic forces are created in the bus bars as a result of short circuit currents up to and including 200,000 rms symmetrical amps flowing through such bus bars. In a three phase power system (typically) as the short-circuit current flows through such bus bars, magnetic forces between adjacent bus bars act to move such bus bars laterally (perpendicular to the current flow). Such movement of the bus bars must be prohibited or inhibited to avoid damage and arcing within the switchgear enclosures.

Bus bar bracing has been-used typically with flat bus bar systems. However, the use of a channel bus bar for the vertical bus distribution system provides advantages over a flat bus bar system. For example, a C-shaped or U-shaped channel bus resists bending and twisting in short-circuit current conditions and is stronger than a flat bar of comparable thickness. Further, the riser channel bus assembly can use one or multiple bars per phase thereby increasing the current density available in the system. Such advantages are obtained resulting in more compact and less expensive (because of less material used) than conventional flat bar bus bar riser systems. In the multi-channel bus bar systems, inner channels are nested inside the outer channels of each phase. (See, for example, FIGS. 2, 6, 9 and 10.).

An additional advantage of use of the channel riser bus bars is air flow in the space between the channel bus bars of each power phase. Such air flow assists in cooling equipment and components within the switchgear assembly. A bracing system for channel bus bars should be configured so as not to block the air flow through the channel bus risers and without intruding into the airspace between power phases of a multiphase power system.

Figure 1:
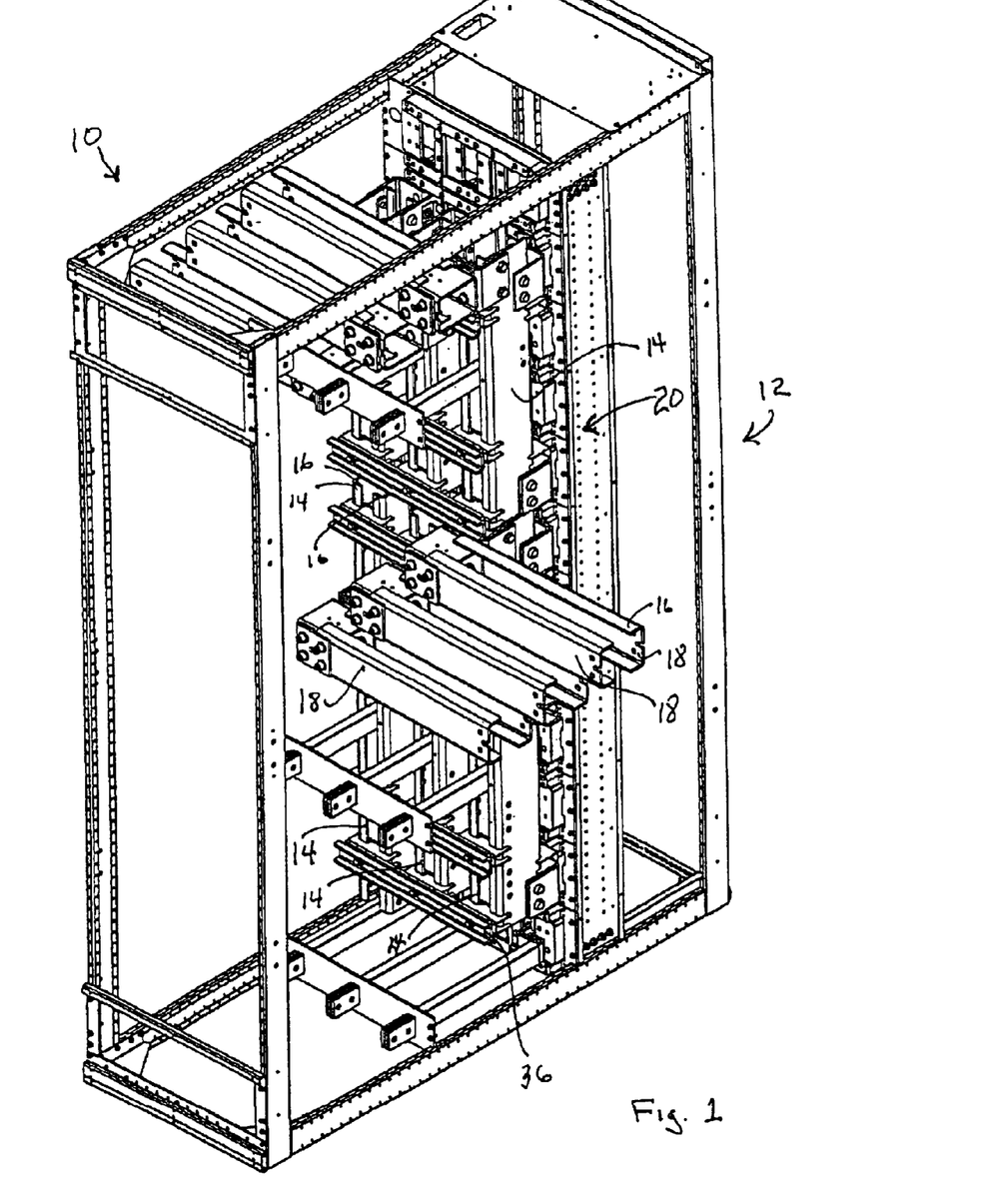
FIG. 1 is a perspective rear view of an exemplary embodiment of a partial multiple phase switchgear assembly mounted in a frame and including an exemplary embodiment of a bus brace comb assembly.
Figure 2:
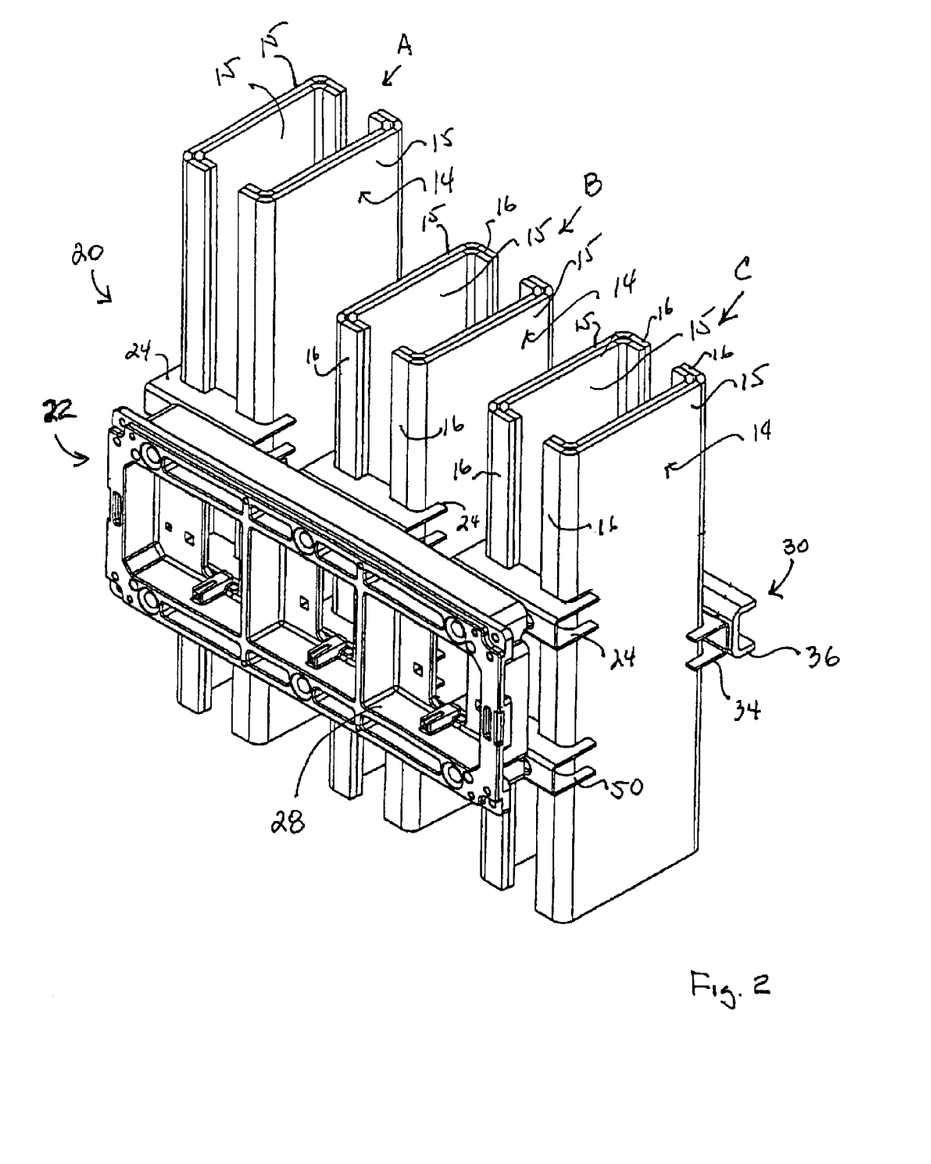
FIG. 2 is a perspective front view of an exemplary embodiment of a bus brace comb assembly coupled to multiple vertical channel bus bars in a multiple phase switchgear assembly.
Figure 3:
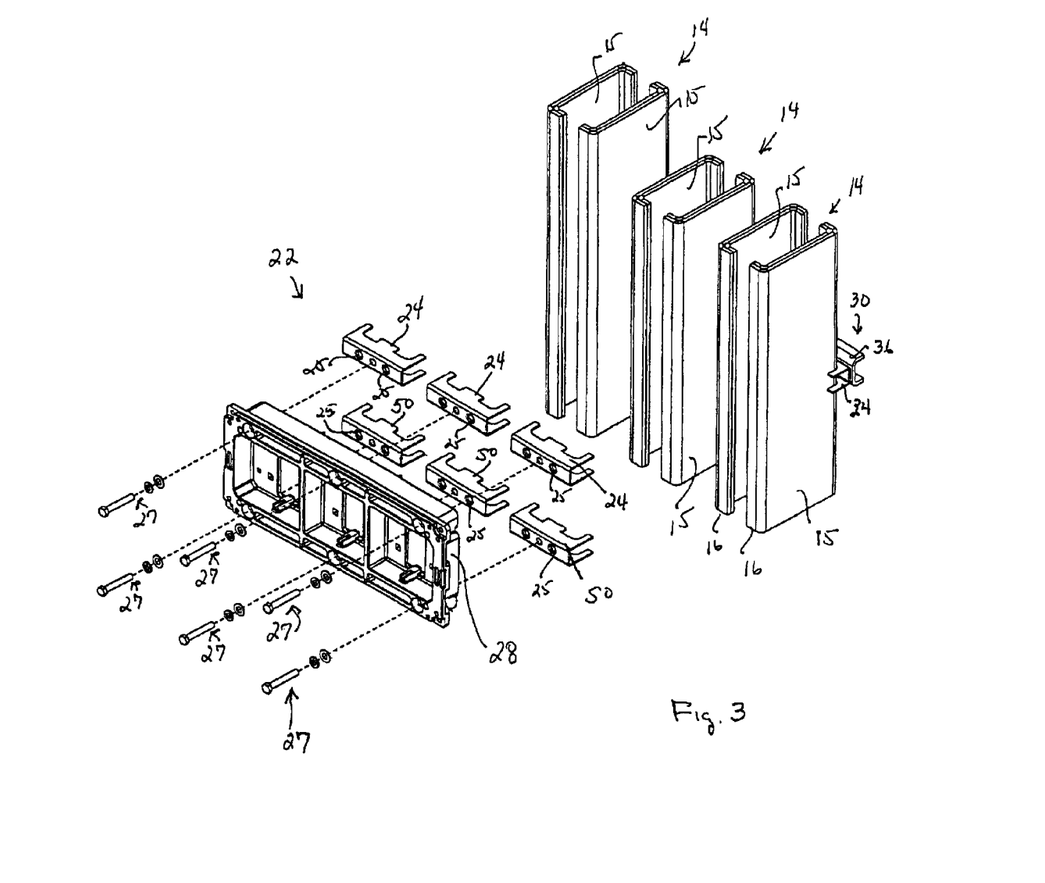
FIG. 3 is an exploded front view of the bus base comb assembly illustrated in FIG. 2.
Figure 4:
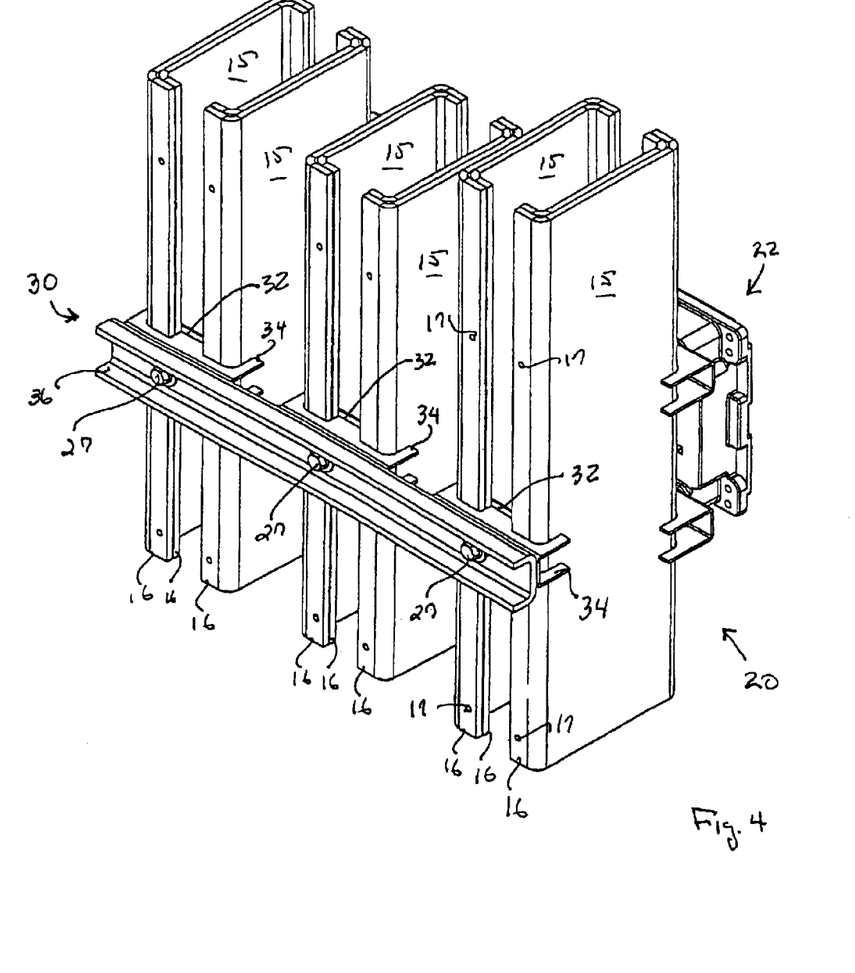
FIG. 4 is a perspective rear view of an exemplary embodiment of a bus brace comb assembly coupled to multiple vertical channel bus bars in a multiple phase switchgear assembly.
Figure 5:
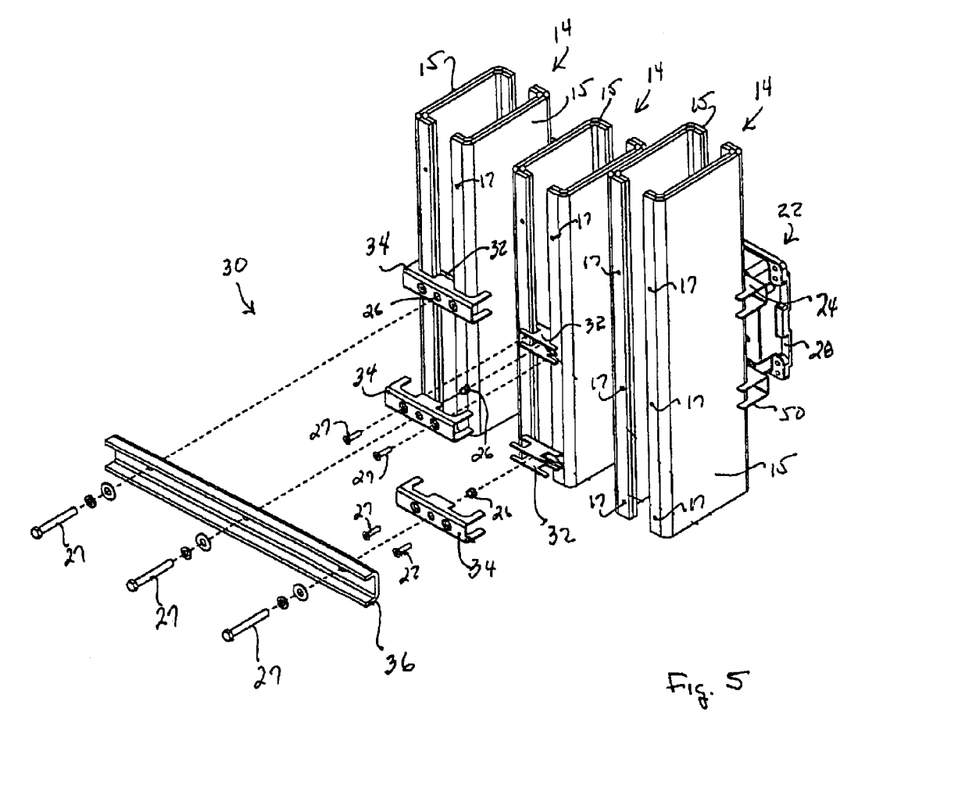
FIG. 5 is an exploded rear view of the bus base comb assembly illustrated in FIG. 4.
Figure 6:
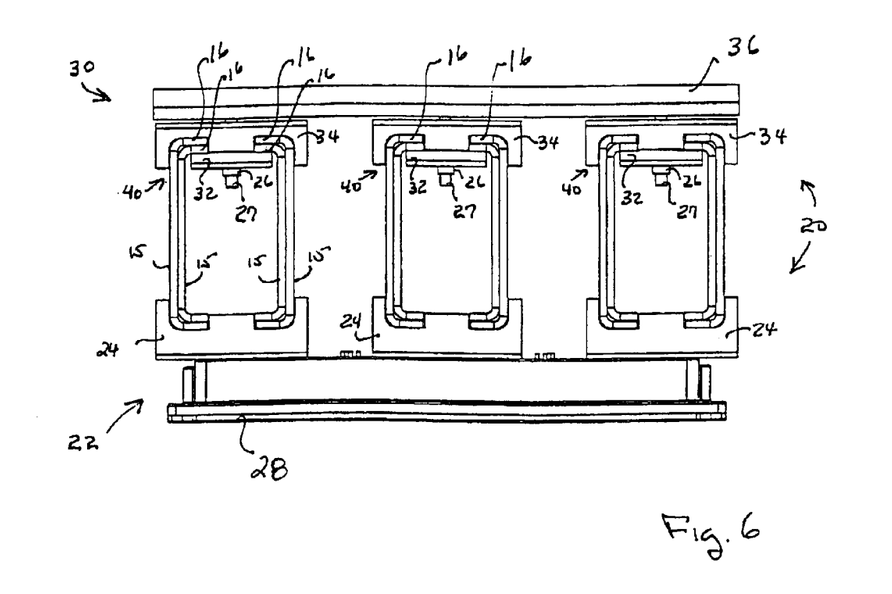
FIG. 6 is a top view of an exemplary embodiment of a bus brace comb assembly coupled to multiple channel bus bars.

Referring now to the figures, FIG. 1 is an illustration of an exemplary embodiment of a switchgear assembly 10, without the outer panels for clarity purposes and without circuit breakers or switchgear or control apparatus. FIG. 1 specifically depicts a multiple phase switchgear assembly 12 conventionally having power phases, A, B, and C. A neutral bus or grounding bus can also be provided. The vertical bus bars 14 extend typically throughout the height of the switchgear assembly 10 with horizontal bus bars 18 selectively positioned and connected (mechanically and electrically) to the vertical bus bars 14 for the distribution of power within the system.

Referring now to FIGS. 2–6, there is illustrated a perspective front and rear view of an exemplary embodiment of a bus brace comb assembly 20 coupled to multiple vertical bus bars 14 of the channel bus bar 15 type. The bus brace comb assembly 20 includes several subassemblies including a front comb assembly 22 and a rear comb assembly 30. When installed, they form the bus brace comb assembly 20 which hold the bus bars 15 in place against magnetic forces associated with short-circuit currents in switchgear bus bars 15.

The front comb assembly 22 includes a front bus clip 24 configured to position the bus bar 15 and a front brace 28 coupled to the bus clip 24. The rear comb assembly 30 includes an interlock clamp 32 configured to engage the channel bus bar 15 and a second bus clip 34 is secured to the interlock clamp 32 and to a flange 16 of the channel bus bar 15 with a fastener 27. The fastener 27 can be a screw, a rivet and a bolt/nut combination of suitable strength and length. A rear brace 36 is coupled to the interlock clamp/bus clip assembly 40. A flange 16 of the channel bus bar 15 is pinched between bus clip 34 and interlock clamp 32 of the interlock clamp/bus clip assembly 40 when fastener 27 is tightened with rear brace 36 in place to secure the channel bus bar 15. The flange 16 is pinched between parts 32 and 34. (See FIG. 6)

A typical procedure includes placing the interlock clamp 32 between the flange 16 of the channel bus bar 15 and then rotating the interlock clamp 32, in place, 90 degrees, to engage the flange 16. This procedure allows the interlock clamp 32 to be installed from the front or the back of the switchgear assembly 10 without having to slide the interlock clamp 32 on the channel bus bar 15 from the bar top or bottom. Such arrangement facilitates maintenance since other apparatus does not have to be removed or moved to install the bus brace comb assembly 20.

A third bus clip 50 is positioned a spaced-distance from the first bus clip 24 and is coupled to the front brace 28. Such configuration is repeated for each power phase A, B and C of the power system in the switchgear assembly 10. A typical configuration for the bus brace comb assembly 20 includes two bus clips 24, 50 be coupled to the front brace 28 which engage each channel bus bar 15 of each power phase of the switchgear assembly 10 and a bus clip 34 coupled to the rear brace 36 and secured to the interlock clamp 32 and the flange 16 of the channel bus bar to engage the flanges 16 on the channel bus bars 15.

Figure 7:
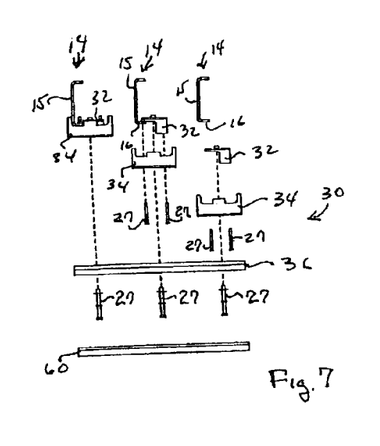
FIG. 7 is an exploded top view of an exemplary embodiment of a rear comb assembly of a bus brace comb assembly for a multiple phase switchgear assembly having a single channel bus bar in each circuit phase.

The bus brace comb assembly 20 can be configured to engage various channel bus bar 15 arrangements. Referring now to FIGS. 7–10, there are illustrated several of such combinations. FIG. 7 illustrates a three phase power system utilizing a single channel bus bar 15 as the vertical bus bar 14 in each power phase and illustrates an exploded view of the rear comb assembly 30. The second bus clip 34 engages an interlock clamp 32 which is configured to engage the one flange 16 of the channel bus bar 15.

Figure 8:
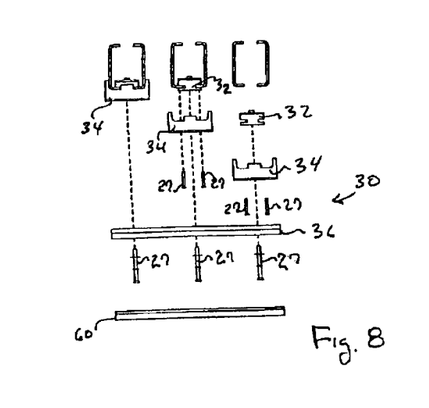
FIG. 8 is an exploded top view of an exemplary embodiment of a rear comb assembly of a bus brace comb assembly for a multiple phase switchgear assembly having two channel bus bars in each circuit phase.

FIG. 8 depicts a rear comb assembly 30 of a bus bar comb assembly 20 of a power system in which each power phase consists of two inward facing channel bus bars 15. For purposes of this application, Applicants submit that "inward facing" refers to the flanges 16 of each channel bus bar 15 pointed towards each other as shown in the figures. In the arrangement illustrated in FIG. 8, the interlock clamp 32 is configured to engage each flange 16 of each channel bus bar 15 and each vertical bus bar 14 assembly of the switchgear assembly 10.

Figure 9:
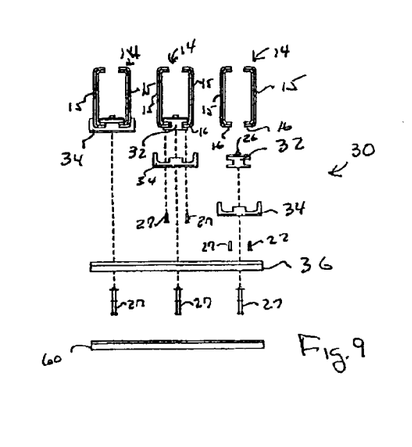
FIG. 9 is an exploded top view of an exemplary embodiment of a rear comb assembly of a bus brace comb assembly for a multiple phase switchgear assembly having multiple channel bus bars in each circuit phase.
Figure 10:
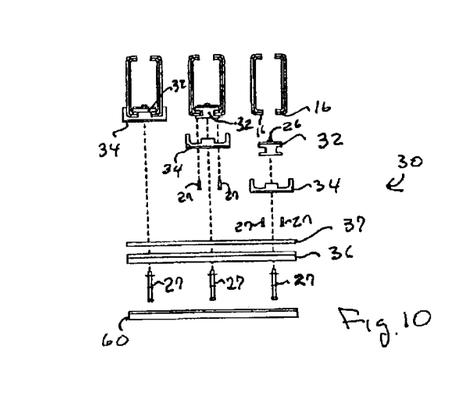
FIG. 10 is an exploded top view of an alternative exemplary embodiment of a rear comb assembly of a bus brace comb assembly for a multiple phase switchgear assembly having multiple channel bus bars in each circuit phase.

FIGS. 9 and 10 illustrate multiple channel bus bars 15 that are nested with each other in each power phase of the switchgear assembly 10. FIG. 10 also illustrates that additional bracing, such as a strap brace 37 can be utilized with the rear brace 36 and that an insulation cover 60 can be utilized with the bus brace comb assembly 20, It should be understood that insulation material can also be installed between the channel bus bars of each power phase and additional insulation covers can be configured to cover the front brace 28 in appropriate applications.

The bus clips 24, 34, and 50 can be configured to accommodate the particular channel bus bar 15 configuration. The illustrated examples provide an E-shaped bus clip.

The front comb assembly 22 is assembled by attaching the first bus clip 24, with fasteners 27 directly to the front brace 28. The first bus clip 24 and the third bus clip 50 which is a spaced distance from the first bus clip 24 are not fastened to the channel bus bars 15 but rather are configured so that the channel bus bars 15 fit within the recesses or notches defined in the bus clips 24, 50. As mentioned above, the bus clips can be E-shaped. The front brace 28 may also serve as a support if the vertical bus bars 14 are attached by a horizontal (branch) bus bar 18 or to metal brackets within the switchgear assembly 10.

The rear comb assembly 30 is attached to the vertical bus bar 14 of each power phase of the switchgear assembly by fasteners 27 which locate the second bus clip 34 and couple to the interlock clamp 32. The interlock clamps 32 are configured to interlock with the flanges 16 of the channel bus bars 15 in each power phase. A self-clinch press nut, 26 is mounted in each interlock clamp 32 and the second bus clip 34 to facilitate the fastening of the rear brace 36, to the second bus clip 34 and the interlock clamp 32 as shown in FIGS. 5–10. The second bus clip 34 is secured to each flange 16 of the channel bus bar 15 by a fastener 27, for example a screw or a rivet through an orifice formed in the flange 16 of the channel bus bar 15.

The front brace 28 can be composed of any Underwriter Laboratories, Inc. recognized sheet molding compound or bulk molding compound to provide suitable, mechanical and electrical, properties with the following minimum ratings: UL-94 VO flammability; UL temperature index=130 degrees C.; comparative track index=3 (max); high current arc ignition=3 (max); hot wire ignition=4 (max). A suitable compound for the front bracing 28 is a sheet molding compound with glass reinforced polyester manufactured by Industrial Dielectrics, Inc. as their product E-205.

The bus clips 24, 34 and 50 and interlock clamp 32 can be composed of 12 gauge galvanized steel or any other suitable material such as stainless steel. The bus clips can be fabricated by punch or press method.

The rear brace 36 and the strap brace 37 can be composed of any Underwriter Laboratories, Inc. recognized insulating and support material with suitable mechanical and electrical properties as described above for the front brace 28. A suitable material for the rear brace 36 is a fiberglass reinforced thermal'set, pultruded, polyester material manufactured by Glastic as their part number 1144. A suitable material for the strap brace 34 is a NEMA grade G10, glass-epoxy laminate.

The insulation cover 60 can be any Underwriter Laboratories, Inc. recognized thermoplastic having the following ratings: UL-94-V1 flammability rating; UL temperature index=110 degrees C.; a comparative track index=3 (max); high current arc ignition=2 (max); and hot wire ignition=3 (max). A suitable material for the insulation cover manufactured by Asahi Xyron 540 volt thermoplastic.

In operation, a method of securing and positioning the channel bus bars 15 in each power phase of the switchgear assembly, with a bus brace comb assembly 20 will be described. The bus brace comb assembly 20 has a front comb assembly 22 and a rear comb assembly 30. In operation the magnetic forces produced by short circuit currents are transferred from the vertical bus bars 14 in the switchgear assembly 10 to the front comb assembly 22 and the rear comb assembly 30 through the bus clips 24, 34, and 50.

The method of securing and positioning the channel bus bars 15 comprises the steps of positioning each channel bus bar 15 in a bus clip 24 of the front comb assembly 22. Installing an interlock clamp 32 to couple with at least one flange 16 of a channel bus bar 15 in each power phase. Fastening another bus clip 34 to the interlock clamp 32 and coupling a rear brace 36 to each bus clip/interlock clamp assembly 40 wherein the flange 16 of the channel bus bar 15 is pinched in interlock clamp/bus clip assembly 40 and each power phase to secure the channel bus bar 15. The method can also include the step of coupling a front brace 28 to the bus clip 24 of the front comb assembly 22. The method can also include the step of positioning a third bus clip 50 a spaced distance from the bus clip 24 of the front comb assembly 22. An insulation cover 60 can be installed on the bus brace comb assembly 20 on one of the rear comb assembly 30 and front comb assembly 22. In a multi-phase switchgear assembly 12, each channel bus bar 15 of each power phase is coupled to the front comb assembly 22 and the rear comb assembly 30.

A typical procedure includes placing the interlock clamp 32 between the flange 16 of the channel bus bar 15 and then rotating the interlock clamp 32, in place, 90 degrees to engage the flange 16. This procedure allows the interlock clamp 32 to be installed from the front or the back of the switchgear assembly 10 without having to slide the interlock clamp 32 on the channel bus bar 15 from the bar top or bottom. Such arrangement facilitates maintenance since other apparatus does not have to be removed or moved to install the bus brace comb assembly 20.

While the embodiments illustrated in the figures and described above are presently disclosed, it should be understood that these embodiments are offered by way of example only. The bus bar comb assembly is not intended to be limited to any particular embodiment, but is intended to extend to various modifications that nevertheless flow within the scope of the intended claims. For example, the bus clips can be composed of an engineered plastic that provides suitable strength and resiliency to withstand short circuit currents anticipated for the switchgear assembly. The bus clips can be configured differently, for example with different notches or grooves, to engage shaped bus bars. It is also contemplated that multiple bus bar comb assemblies can be coupled to the same channel bus bars of vertical riser bus bar a spaced distance from each other within the switchgear frame. Other modifications will be evident to those with ordinary skill in the art.

What is claimed is:

1. A bus brace comb assembly for use in a switchgear assembly, the switchgear assembly having a channel bus bar for conveying electrical current in each phase, to hold the bus bar in place against magnetic forces associated with short-circuit currents in the switchgear bus bar, the bus brace comb assembly comprising:

a front comb assembly including a first bus clip configured to position the bus bar and a front brace coupled to the bus clip; and a rear comb assembly including an interlock clamp configured to engage the channel bus bar and second bus clip secured to the interlock clamp with a fastener and a rear brace coupled to the interlock clamp/bus clip assembly, wherein a flange of the channel bus bar is pinched between the rear brace and the interlock clamp/bus clip assembly to secure the channel bus bar.

2. The bus brace comb assembly of claim 1, including a third bus clip a spaced-distance from the first bus clip and coupled to the front brace.

3. The bus brace comb assembly of claim 1, wherein the front brace and rear brace are configured to couple with a plurality of bus clips in a multiple phase switchgear assembly.

4. The bus brace comb assembly of claim 3, wherein the bus clips are E-shape.

5. The bus brace comb assembly of claim 1, wherein each bus brace comb is configured to receive multiple channel bus bars.

6. The bus brace comb assembly of claim 3, including an insulation cover.

7. A switchgear assembly including a channel bus bar for each electric power phase and for conveying electric current, with the channel bus bar maintained in position by a bus brace comb assembly and braced against magnetic forces associated with short-circuit currents in the switchgear bus bar by the bus brace comb, the bus brace comb assembly comprising:

a front comb assembly including a first bus clip configured to position the bus bar and a front brace coupled to the bus clip; and a rear comb assembly including an interlock clamp configured to engage the channel bus bar and second bus clip secured to the interlock clamp with a fastener and a rear brace coupled to the interlock clamp/bus clip assembly, wherein a flange of the channel bus bar is pinched between the rear brace and the interlock clamp/bus clip assembly to secure the channel bus bar.

8. The switchgear assembly of claim 7, including a third bus clip a spaced-distance from the first bus clip and coupled to the front, brace.

9. The switchgear assembly of claim 7, wherein the front brace and rear brace are configured to couple with a plurality of bus clips in a multiple phase switchgear assembly.

10. The switchgear assembly of claim 9, wherein the bus clips are E-shape.

11. The switchgear assembly of claim 7, wherein each bus clip is configured to receive multiple channel bus bars.

12. The switchgear assembly of claim 9, including an insulation cover.

13. A method of securing and positioning channel bus bars in each power phase of a switchgear assembly with a bus brace comb assembly having a front comb assembly and a rear comb assembly, the method comprising the steps of:

positioning each channel bus bar in a bus clip of the front comb assembly;

installing an interlock clamp to couple with at least one flange of a channel bus bar in each power phase;

fastening another bus clip-to the interlock clamp; and coupling a rear brace to each bus clip/interlock clamp assembly, wherein the flange of the channel bus bar is pinched in the interlock clamp/bus clip assembly to secure the channel bus bar.

14. The method of claim 13, including the step of coupling a front brace to the bus clip of the front comb assembly.

15. The method of claim 13, including the step of positioning a third bus clip a spaced distance from the bus clip of the front comb assembly.

16. The method of claim 13, wherein each channel bus bar of each power phase is coupled to the front comb assembly and rear comb assembly.

17. The method of claim 16, including the step of installing an insulation cover on the bus brace comb assembly.

18. The method of claim 13, wherein each bus clip is E-shaped.

* * * * *

UNITED STATES PATENT AND TRADEMARK OFFICE
CERTIFICATE OF CORRECTION

| | | |
|---|---|---|
| PATENT NO. | : 6,781,818 B2 | |
| APPLICATION NO. | : 10/602757 | |
| DATED | : August 24, 2004 | |
| INVENTOR(S) | : Harry W. Josten and Jason P. Wiant | |

It is certified that error appears in the above-identified patent and that said Letters Patent is hereby corrected as shown below:

Col. 8, line 8 (Claim 8, line 3), following "front" delete ",".

Signed and Sealed this

Tenth Day of April, 2007

JON W. DUDAS
*Director of the United States Patent and Trademark Office*